(12) United States Patent
Cha et al.

(10) Patent No.: US 11,458,885 B2
(45) Date of Patent: Oct. 4, 2022

(54) COMMUNICATION APPARATUS THROUGH GRILLE OF VEHICLE

(71) Applicants: Hyundai Motor Company, Seoul (KR); Kia Motors Corporation, Seoul (KR)

(72) Inventors: Dong Eun Cha, Gyeonggi-do (KR); Hyun Kyung Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 185 days.

(21) Appl. No.: 16/917,196

(22) Filed: Jun. 30, 2020

(65) Prior Publication Data

US 2021/0261045 A1    Aug. 26, 2021

(30) Foreign Application Priority Data

Feb. 20, 2020   (KR) .................. 10-2020-0020792

(51) Int. Cl.
| | |
|---|---|
| *B60Q 1/26* | (2006.01) |
| *B60Q 1/28* | (2006.01) |
| *B60Q 1/50* | (2006.01) |
| *B60R 19/52* | (2006.01) |
| *B60Q 1/00* | (2006.01) |

(Continued)

(52) U.S. Cl.
CPC .......... *B60Q 1/2661* (2013.01); *B60K 11/085* (2013.01); *B60Q 1/0011* (2013.01); *B60Q 1/2619* (2013.01); *B60Q 1/28* (2013.01); *B60Q 1/36* (2013.01); *B60Q 1/50* (2013.01); *B60R 19/52* (2013.01); *B60W 60/00* (2020.02); *B60Q 1/0017* (2013.01); *B60Q 2400/50* (2013.01); *B60R 2019/525* (2013.01)

(58) Field of Classification Search
CPC .. B60Q 1/2661; B60Q 1/0011; B60Q 1/2619; B60Q 1/28; B60Q 1/36; B60Q 1/50; B60Q 1/0017; B60Q 2400/50; B60Q 1/0035; B60Q 1/503; B60Q 1/0088; B60Q 1/346; B60K 11/085; B60R 19/52; B60R 2019/525; B60W 60/00; Y02T 10/88; B62D 37/02
USPC ......................................... 340/468
See application file for complete search history.

(56) References Cited

U.S. PATENT DOCUMENTS

| | | | | |
|---|---|---|---|---|
| 4,163,416 | A | * | 8/1979 | Kurrle ............... F24F 13/072 454/304 |
| 4,377,107 | A | * | 3/1983 | Izumi ............... F24F 13/075 454/316 |

(Continued)

FOREIGN PATENT DOCUMENTS

| | | |
|---|---|---|
| KR | 1020120061236 A | 6/2012 |
| KR | 2015-0138596 A | 12/2015 |

OTHER PUBLICATIONS

[DIFA 2019 Video] SL Unveiled Next-generation Lamps 'Models 2020, 2030, and 2040' that will Light the Way to the Future of Car, Aving Global Network, 2019, 5 pages (1 page in English & 4 pages in Forigen Language).

*Primary Examiner* — Eric Blount
(74) *Attorney, Agent, or Firm* — Fox Rothschild LLP (57) ABSTRACT

A communication apparatus is provided through a grille of a vehicle. The apparatus communicates with the outside through the grille of the vehicle and improves driving performance of the vehicle due to improvement in aerodynamic performance through the grille of the vehicle.

10 Claims, 6 Drawing Sheets

(51) Int. Cl.
*B60W 60/00* (2020.01)
*B60K 11/08* (2006.01)
*B60Q 1/36* (2006.01)

(56) References Cited

U.S. PATENT DOCUMENTS

| | | | |
|---|---|---|---|
| 9,249,945 B2* | 2/2016 | Kim | F21S 43/30 |
| 9,828,036 B2* | 11/2017 | Frayer | H01Q 1/3233 |
| 9,937,966 B1* | 4/2018 | Yoon | F03G 7/065 |
| 10,479,296 B2* | 11/2019 | Glickman | B62D 65/16 |
| 10,529,229 B2* | 1/2020 | Salter | B60Q 1/2607 |
| 10,753,568 B2* | 8/2020 | Salter | F21S 43/195 |
| 10,793,094 B2* | 10/2020 | Salter | B60R 11/04 |
| 11,034,292 B2* | 6/2021 | Glickman | B60R 11/0229 |
| 11,034,317 B2* | 6/2021 | Salter | F21S 43/16 |
| 11,060,670 B2* | 7/2021 | Kim | B60R 19/50 |
| 11,164,404 B2* | 11/2021 | Dudar | B60K 11/085 |
| 2012/0138174 A1* | 6/2012 | Baek | B60K 11/085 137/561 R |
| 2014/0290599 A1* | 10/2014 | Numata | F01P 7/12 123/41.05 |
| 2019/0270416 A1* | 9/2019 | Glickman | B62D 25/085 |
| 2021/0031678 A1* | 2/2021 | Glickman | B60Q 1/28 |

\* cited by examiner

FIG. 7

# COMMUNICATION APPARATUS THROUGH GRILLE OF VEHICLE

CROSS-REFERENCE TO RELATED APPLICATION

This application claims priority benefit of Korean Patent Application No. 10-2020-0020792, filed on Feb. 20, 2020, the disclosure of which is incorporated herein by reference.

BACKGROUND

1. Field of the Disclosure

The present disclosure relates to a communication apparatus through a grille of a vehicle which is capable of communicating with the outside through the grille of the vehicle and improves driving performance of the vehicle due to improvement in aerodynamic performance through the grille of the vehicle.

2. Description of the Related Art

Recently, as autonomous vehicles have been developed, technology for ensuring vehicle and pedestrian safety relating to autonomous driving is required. Accordingly, an autonomous vehicle is configured to transmit and receive information based on driving environment and surrounding situation to avoid interference with a peripheral vehicle or an external factor.

In other words, the autonomous vehicle displays information related to whether the autonomous vehicle is currently being driven autonomously, the driving direction of the autonomous vehicle, etc., to the outside of the vehicle to allow pedestrians to recognize the autonomous vehicle, and, in this case, may require an additional space to transmit a corresponding message and provide false information to the pedestrians due to unclarity in communication.

The above description disclosed in this section is merely for enhancement of understanding of the background of the disclosure and therefore it may contain information that does not form the prior art that is already known to a person of ordinary skill in the art.

SUMMARY

Therefore, the present disclosure provides a communication apparatus through a grille of a vehicle capable of communicating with the outside through the grille of the vehicle and improves driving performance of the vehicle due to improvement in aerodynamic performance through the grille of the vehicle.

In accordance with the present disclosure, the above and other objects can be accomplished by the provision of a communication apparatus through a grille of a vehicle, the communication apparatus may include the grille disposed on a front surface portion of the vehicle and including a plurality of ventilation apertures configured to pass air therethrough, moving modules disposed on the grille to be movable and including a plurality of shield parts configured to respectively match with the ventilation apertures, an optical module installed on the grille or the moving modules so as to emit light to an area in front of the vehicle, and a controller configured to adjust positions of the moving modules and turning-on and off of the optical module, to receive diving information of the vehicle, to drive the moving modules according to the driving information of the vehicle to close some of the ventilation apertures, and simultaneously to project an illumination image for transmitting a message through operation of the optical module.

A plurality of moving modules may be provided, installed at different positions, and individually moved to open or close all the ventilation apertures or to selectively open or close some of the ventilation apertures. Each of the moving modules may include a drive unit installed on one of a vehicle body and the grille to transmit power, and a moving unit provided to be movable in a lateral direction of the grille and including the shield parts configured to open or close the ventilation apertures.

The drive unit may be installed on the vehicle body to be spaced apart from the grille, the moving unit may be disposed to be spaced backwards from the grille, and the shield parts extending forwards from the moving unit may be provided to respectively match with the ventilation apertures. The shield parts may be formed to have an area less than that of the ventilation apertures. A plurality of moving modules may be provided, disposed at left and right sides of the grille, and installed to be movable laterally to individually open or close left ventilation apertures and right ventilation apertures of the grille.

At initial positions of the respective moving modules divisionally disposed at the left and right sides of the grille, the shield parts may be disposed behind the grille, and, when the moving modules are operated, the shield parts of the moving module disposed at the left side of the grille may be moved leftwards from the initial position thereof, and the shield parts of the moving module disposed at the right side of the grille may be moved rightwards from the initial position thereof. The grille may be formed in a pattern in which the ventilation apertures have overlapping sections in a vertical direction. A plurality of moving modules may be provided to intersect each other in the vertical direction of the grille, and, when the moving modules are operated, the shield parts configured to intersect each other in the vertical direction may be moved in opposite directions.

The optical module may include light sources installed on the grille to emit light rearwards towards the shield parts, and reflectors fixed to the shield parts to be moved together with the shield parts, and to reflect light emitted from the light sources forwards to project the light to an outside of the grille to change a light projecting position together with movement of the shield parts. The controller may be configured to determine whether the vehicle is driven autonomously, and project an illumination image for transmitting a message through the optical module in response to determining that the vehicle is driven autonomously. The controller may be configured to operate the moving module disposed at a side opposite to a turning direction of the vehicle during turning to close some of the ventilation apertures, and simultaneously operate the optical module to project an illumination image for transmitting a message based on turning of the vehicle.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. Wherever possible, the same reference numbers will be used throughout the drawings to refer to the same or like parts.

Figure 1:
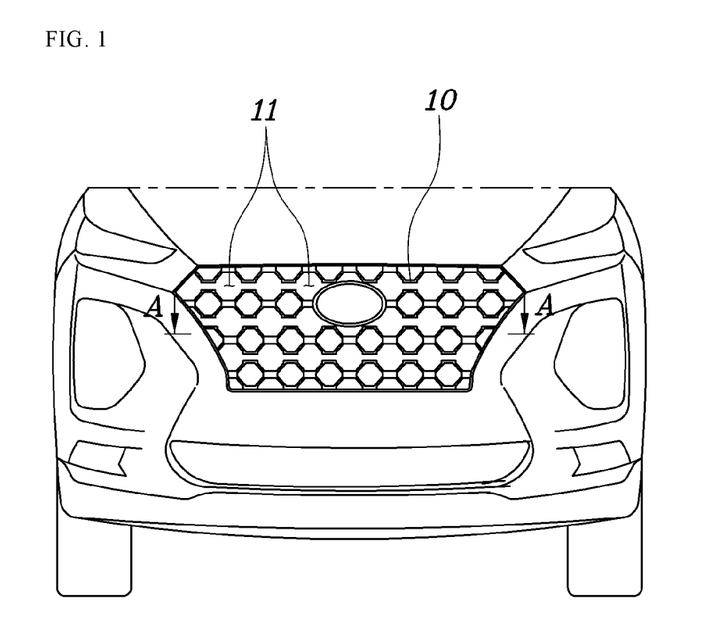
FIG. 1 is a front view illustrating a front surface portion of a vehicle according to an exemplary embodiment of the present disclosure.
Figure 2:
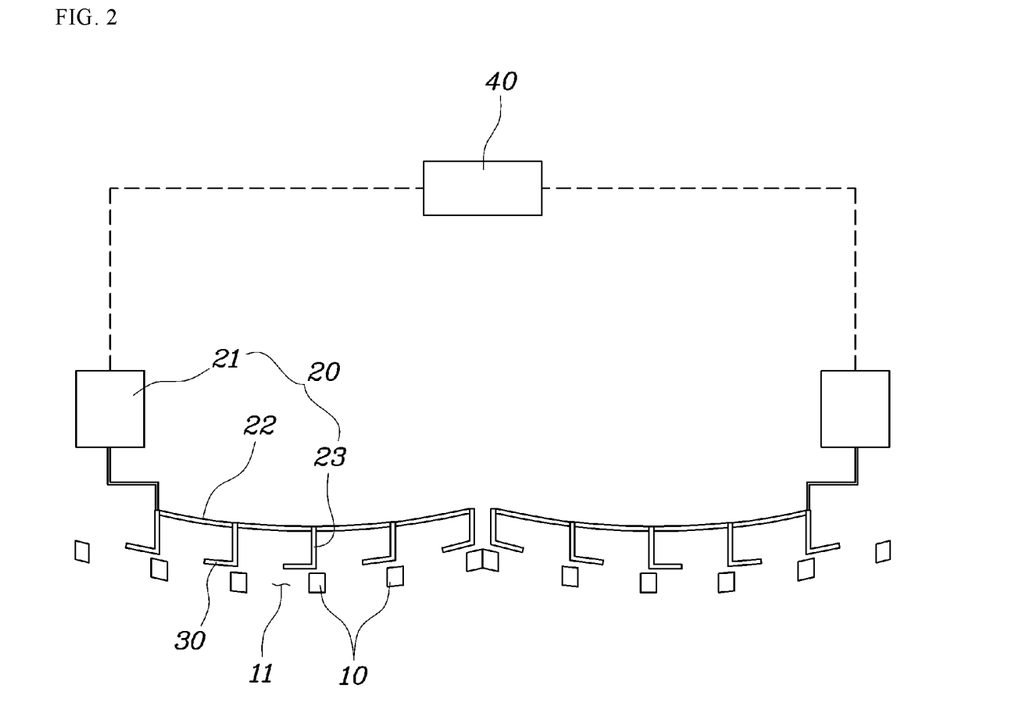
FIG. 2 is a cross-sectional view of the front surface portion of the vehicle shown in FIG. 1, taken along line A-A' according to an exemplary embodiment of the present disclosure.

A communication apparatus through a grille 10 of a vehicle according to the present disclosure may include, as shown in FIGS. 1 and 2, the grille 10 disposed on a front surface portion of the vehicle and including a plurality of ventilation apertures 11 through which air passes, moving modules 20 disposed on the grille 10 to be movable and including a plurality of shield parts 23 matching with the respective ventilation apertures 11, an optical module 30 installed on the grille 10 or the moving modules 20 to emit light to an area in front of the vehicle, and a controller 40 configured to adjust the positions of the moving modules 20 and the turning-on and off of the optical module 30, to receive diving information of the vehicle, to drive the moving modules 20 according to the driving information of the vehicle to close some of the ventilation apertures 11, and simultaneously to project an illumination image for transmitting a message through operation of the optical module 30.

In particular, the grille 10 may be disposed on the front surface portion of the vehicle, and the ventilation apertures 11 may be formed in the grille 10 so that air flows into and out of the grille 10 through the ventilation apertures 11. The ventilation apertures 11 may to form a specific-shaped pattern. The moving modules 20 may be disposed on the grille 10 to be movable and may include the shield parts 23 matching with the respective ventilation apertures 11. Accordingly, as the moving modules 20 are moved on the grille 10, the ventilation apertures 11 may be closed by the shield parts 23 when the shield parts 23 match with the ventilation apertures 11, and may be opened when the shield parts 23 deviate from the ventilation apertures 11.

The optical module 30 which emits light may be installed on the grille 10 or the moving modules 20. However, since the optical module 30 must be connected with the operation of the moving modules 20, the optical module 30 may reflect light through the moving modules 20 to thus emit the reflected light to the area in front of the vehicle when the optical module 30 is installed on the grille 10, or may directly emit light to the area in front of the vehicle when the optical module 30 is installed on the moving modules 20.

The controller 40 configured to operate the moving modules 20 and the optical module 30 may be configured to receive driving information of the vehicle, and adjust the positions of the moving modules 20 and the turning-on and off of the optical module 30. Particularly, the controller 40 may be configured to determine whether the vehicle is driven autonomously, and project an illumination image for transmitting a message through the optical module 30 in response to determining that the vehicle is driven autonomously, thereby being capable of ensuring stability of the vehicle during autonomous driving.

Particularly, the driving information input to the controller 40 may include information regarding whether the vehicle is driven autonomously, information regarding whether the vehicle turns, etc., and external information may be additionally input to the controller 40. Accordingly, the controller 40 may be configured to approve external input through a cloud server, matching between servers may be performed through additional approval in an interface of the vehicle, and particularly, in an autonomous driving mode, the vehicle may be operated in predetermined control order based on the driving information of the host vehicle and an external situation.

The controller 40 may thus be configured to receive the driving information of the vehicle, operate the moving modules 20 based on the corresponding driving information to close some of the ventilation apertures 11 to ensure aerodynamic performance based on driving of the vehicle, and simultaneously operate the optical module 30 to project an illumination image for transmitting a message to the area in front of the vehicle. Therefore, operation of the autonomous vehicle may be confirmed in real time even at the outside of the vehicle to allow that pedestrians to recognize the operation of the autonomous vehicle, and driving performance of the vehicle may be ensured due to consideration of aerodynamic performance.

The communication apparatus according to the present disclosure will be described below in more detail. As shown in FIG. 2, a plurality of moving modules 20 are provided, installed at different positions, and individually moved to open or close all the ventilation apertures 11 or to selectively open or close some of the ventilation apertures 11. Accordingly, if a plurality of moving modules 20 are provided and installed at different positions, the shield parts 23 of the respective moving modules 20 may match with all the ventilation apertures 11 of the grille 10.

Further, the respective moving modules 20 may be individually driven to selectively open or close some of the ventilation apertures 11, thereby being capable of adjusting the flow rate of air passing through the ventilation apertures 11 of the grille 10 and thus adjusting aerodynamic performance. In addition, through the individual driving of the moving modules 20, light emitted by the optical module 30 may be projected to the area in front of the vehicle through specific ventilation apertures 11.

The moving module 20 may include a drive unit 21 installed on a vehicle body or the grille 10 to transmit power, and a moving unit 22 provided to be movable in a lateral direction of the grille 10 and including the shield parts 23 configured to open or close the ventilation apertures 11. Accordingly, the moving module 20 may include the drive unit 21 and the moving unit 22, the drive unit 21 may include a motor which is rotatable in a regular direction and the reverse direction, and the moving unit 22 may be moved by receiving rotary force from the drive unit 21 to thus change the positions of the shield parts 23. As a connection structure between the drive unit 21 and the moving unit 22, various power transmission methods, such as a rack and pinion connection structure, a gear connection structure, etc., may be applied.

In Particular, the drive unit 21 may be installed on the vehicle body to be spaced apart from the grille 10, the moving unit 22 may be disposed to be spaced backwards from the grille 10, and the shield parts 23 extending forwards from the moving unit 22 may be provided to respectively match with the ventilation apertures 11. In other words, if the drive unit 21 is disposed within the range of a region of the grille 10 in which the ventilation apertures 11 are formed, the drive unit 21 may be exposed through the ventilation apertures 11, and thus the exterior design of the vehicle may be deteriorated and air circulation may be hindered.

Further, the moving unit 22 may be disposed to be spaced backwards from the grille 10, i.e., not exposed to the front of the grille 10, and thus the design of the grille 10 may be maintained, and the shield parts 23 extending forwards from the moving unit 22 respectively match with the ventilation apertures 11 and thus the flow rate of air passing through the ventilation apertures 11 may be adjusted. Accordingly, when the drive unit 21 of the moving module 20 is operated, the moving unit 22 may be moved laterally behind the grille 10 and therefore, the shield parts 23 may close or open the ventilation apertures 11.

The shield parts 23 may be formed to have an area less than that of the ventilation apertures 11. The shield parts 23 may be formed to have an area equal to or greater than that of the ventilation apertures 11 to completely close the ventilation apertures 11 when the shield parts 23 match with the ventilation apertures 11, and in this case, if air is not circulated through the ventilation apertures 11, parts disposed in the grille 10 may not be cooled smoothly. Therefore, the shield parts 23 may be formed to have an area less than that of the ventilation apertures 11 so that, even when the shield parts 23 close the ventilation apertures 11, air may be circulated through the ventilation apertures 11 and thus the parts provided in the grille 10 may be cooled. Further, since sufficient aerodynamic performance may be expected only by adjusting the flow rate of air circulated through the ventilation apertures 11, the shield parts 23 may have an area less than that of the ventilation apertures 11.

Figure 3:
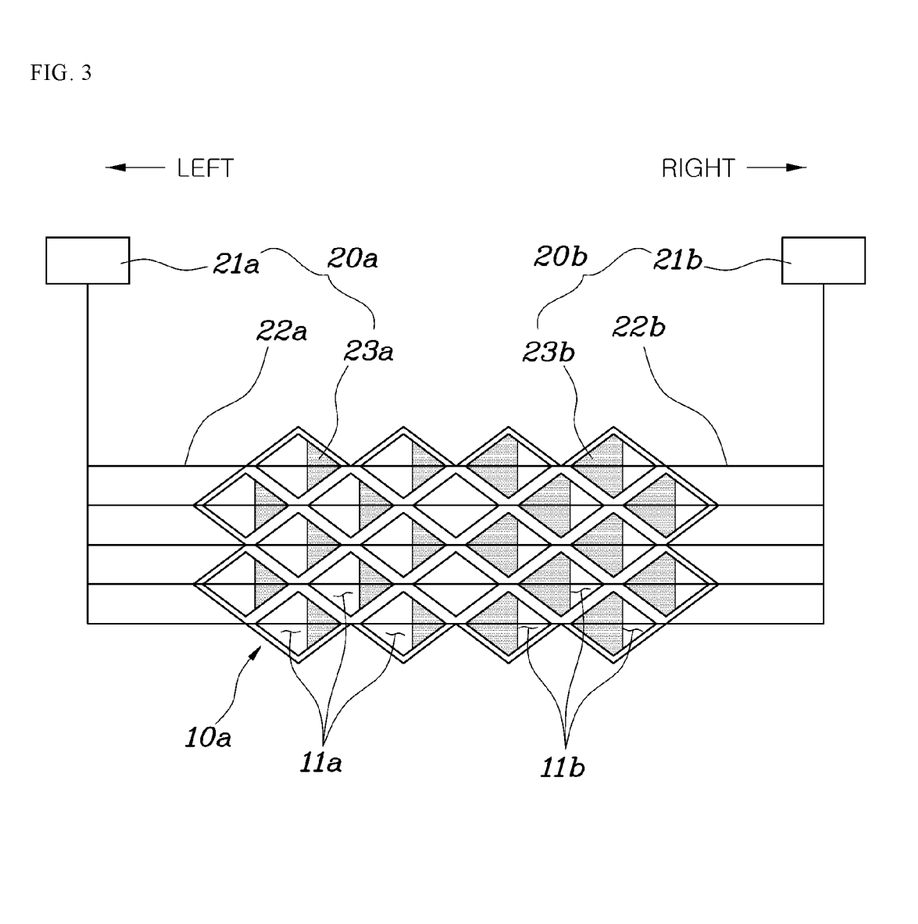
FIGS. 3 to 5 are views illustrating communication apparatuses through a grille of a vehicle according to respective exemplary embodiments of the present disclosure.

Various exemplary embodiments for opening or closing of ventilation apertures 11 of a grille 10 based on the configuration of moving modules 20 will be described below. In one exemplary embodiment, as shown in FIG. 3, moving modules 20, which are provided in plural, may be disposed at left and right sides of a grille 10, and may be movable laterally to individually open or close left ventilation apertures 11a and right ventilation apertures 11b of the grille.

In other words, the moving modules 20 may include a left moving module 20a and a right moving module 20b, and the respective moving modules 20a and 20b may be individually operated. Therefore, the left moving module 20a and the right moving module 20b respectively include drive units 21a and 21b and moving units 22a and 22b, shield parts 23a of the left moving module 20a open or close the left ventilation apertures 11a of the grille 10, and shield parts 23b of the right moving module 20b open or close the right ventilation apertures 11b of the grille 10.

In particular, at initial positions of the respective moving modules 20a and 20b divisionally provided at the left and right sides of the grille 10, the shield parts 23a and 23b may be disposed behind the grille 10 to not be exposed to the front of the grille 10. Particularly, when the moving modules 20a and 20b are operated, the shield parts 23a of the left moving module 20a may be moved leftwards from the initial position of the left moving module 20a, and the shield parts 23b of the right moving module 20b may be moved rightwards from the initial position of the right moving module 20b. Particularly, the initial positions of the moving modules 20a and 20b indicate that the respective shield parts 23a and 23b are located at the central portion of the grille 10. In other words, referring to FIG. 3, the shield parts 23a of the left moving module 20a may be disposed at the initial position of the left moving module 20a, and the shield parts 23b of the right moving module 20b may be moved in a direction of closing the ventilation apertures 11b.

The respective shield parts 23a and 23b may be moved to the left and right from the center of the grille 10, as described above, to open or close the respective ventilation apertures 11a and 11b. Further, the respective shield parts 23a and 23b may be configured to individually open or close the left ventilation apertures 11a or the right ventilation apertures 11b by tracking the driving direction of the vehicle, thereby being capable of improving aerodynamic performance.

Figure 4:
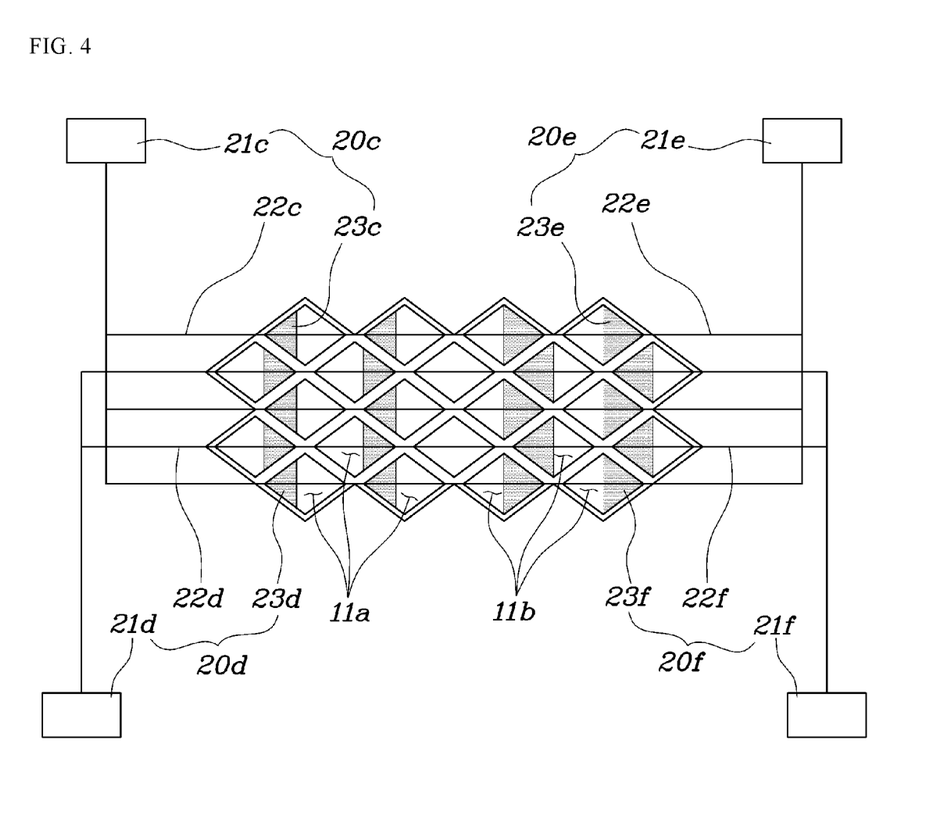

In another exemplary embodiment, as shown in FIG. 4, a grille 10 may be formed in a pattern in which a plurality of ventilation apertures 11 have overlapping sections in the vertical direction. As the ventilation apertures 11 of the grille 10 are provided in the pattern in which the ventilation apertures 11 have the overlapping sections, the ventilation apertures 11 may have a diamond shape. In particular, a plurality of moving modules 20 may be disposed to intersect each other in the vertical direction of the grille 10 and, when the moving modules 20 are operated, respective shield parts 23 which intersect each other in the vertical direction may be moved in opposite directions. Accordingly, when opened areas of the ventilation apertures 11 are adjusted, the shield parts 23 may implement a pulling and spreading operation.

For this purpose, the moving module 20 may include a first moving module 20c and a second moving module 20d which are disposed at the left of the grille 10, and a third moving module 20e and a fourth moving module 20f which are disposed at the right of the grille 10. Therefore, the first, second, third and fourth moving modules 20c, 20d, 20e and 20f respectively may include drive units 21c, 21d, 21e and 21f and moving units 22c, 22d, 22e and 22f, the first and second moving modules 20c and 20d open or close left ventilation apertures 11a of the grille 10, and the third and fourth moving modules 20e and 20f open or close right ventilation apertures 11b of the grille 10. Particularly, the first moving module 20c and the second moving module 20d may be driven in opposite directions and the third moving module 20e and the fourth moving module 20f may be driven in opposite direction, and first and second shield parts 23c and 23d overlapping each other in the vertical direction and second and third shield parts 23e and 23f overlapping each other in the vertical direction may implement the pulling and spreading operation.

Thereby, referring to FIG. 4, the first and second shield parts 23c and 23d disposed at the left of the grille 10 may be disposed at the initial positions of the first and second moving modules 20c and 20d, i.e., in a pulling state, and the third and fourth shield parts 23e and 23f disposed at the right of the grille 10 may be moved to close the ventilation apertures 11b, i.e., in a spreading state. Accordingly, the respective shield parts 23c, 23d, 23e and 23f may be moved in the leftward and rightward directions of the grille 10, thereby being capable of opening or closing the respective ventilation apertures 11a and 11b.

Figure 5:
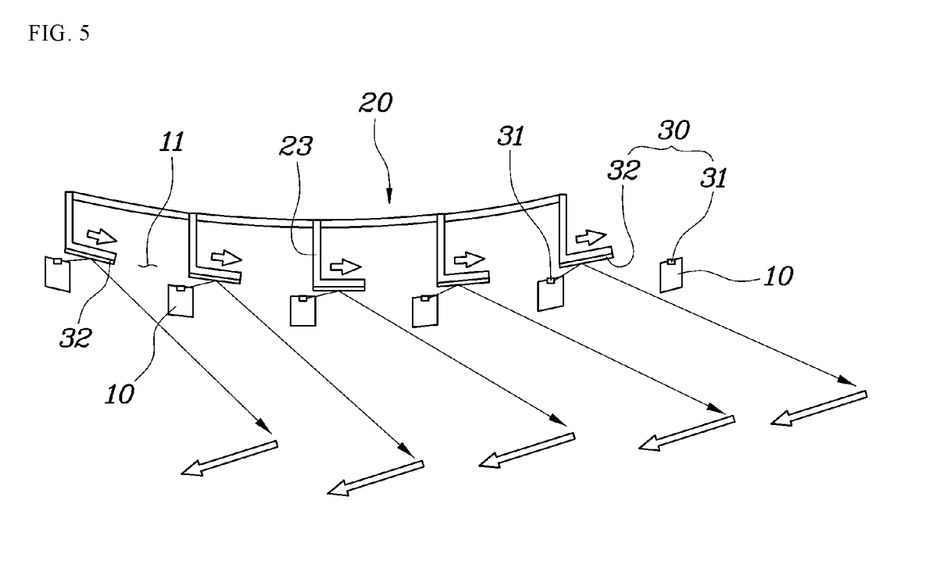
Figure 6:
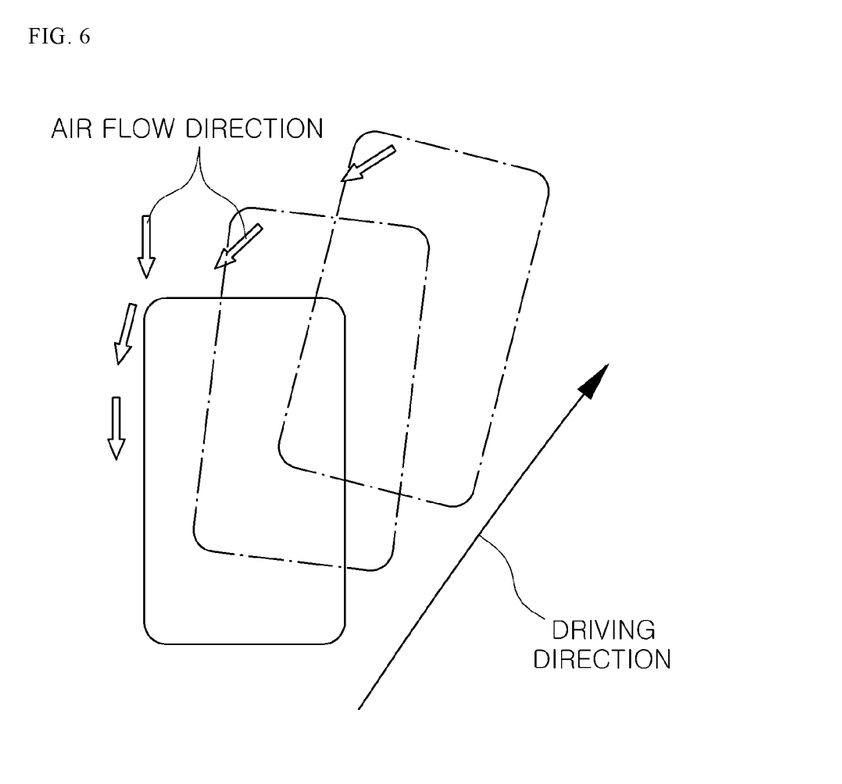
FIGS. 6 and 7 are views illustrating operation of a communication apparatus through a grille of a vehicle according to an exemplary embodiment of the present disclosure.
Figure 7:
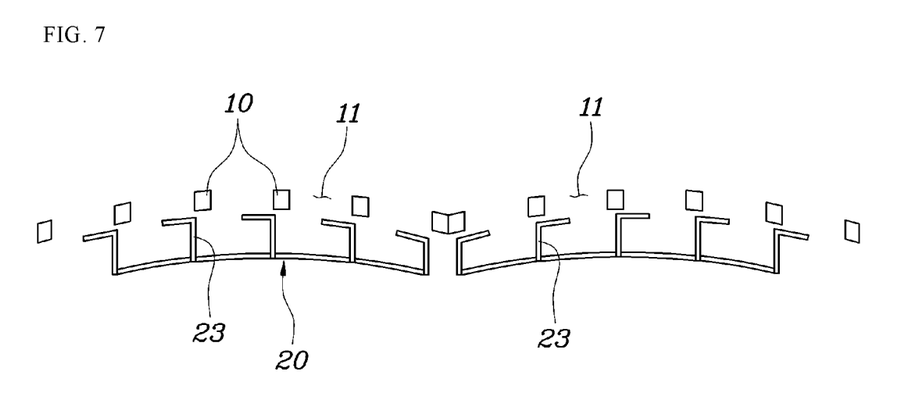

As shown in FIG. 5, the optical module 30 may include light sources 31 which are installed on the grille 10 to emit light rearwards towards the shield parts 23, and reflectors 32 fixed to the shield parts 23 to be moved together with the shield parts 23, and reflect light emitted from the light sources 31 forwards to project the light to the outside of the grille 10 to change a light projecting position together with movement of the shield parts 23.

In the optical module 30 according to one exemplary embodiment of the present disclosure, the light sources 31 may be installed to emit light towards the shield parts 23, and the reflectors 32 configured to reflect the light emitted by the light sources 31 may be disposed at the shield parts 23 to thus change a projection image of light depending on the moved positions of the shield parts 23. In other words, the light sources 31 may be installed on the rear surface of the grille 10, and the reflectors 32 may be installed on the front surfaces of the shield parts 23. Therefore, when the shield parts 23 are disposed on the rear surface of the grille 10, light emitted by the light sources 31 may not be projected to an area in front of the vehicle due to the grille 10, and when the shield parts 23 are moved from the rear surface of the grille 10 towards the ventilation apertures 11, light emitted by the light sources 31 may be projected to the area in the front of the vehicle.

Accordingly, light emitted by the light sources 31 provides an effect in which an image of light projected through continuity of shade may be continuously moved according to movement of the shield parts 23. The optical module 30 provides directionality through an image of light based on the moved positions of the shield parts 23, thereby being capable of transmitting a message indicating the driving direction of the vehicle, etc. to the outside.

Through the above-described moving modules 20 and optical module 30, the controller 40 may be configured to operate the moving module 20, disposed at a side opposite to the turning direction of the vehicle during turning to close some of the ventilation apertures 11, and simultaneously operate the optical module 30 to project an illumination image for transmitting a message based on turning of the vehicle.

In particular, the controller 40 may be configured to receive angle information of a steering wheel, and determine whether the vehicle turns based on a change in the angle of the steering wheel. Thereafter, in response to determining that the vehicle turns, the controller 40 may be configured to operate the moving module 20, which is disposed at the side opposite to the turning direction of the vehicle, based on the angle of the steering wheel so that the shield parts 23 close the ventilation apertures 11 disposed at the side opposite to the turning direction of the vehicle. Accordingly, an air velocity at the side opposite to the turning direction of the vehicle may be increased, and thus air resistance may be decreased and turning stability of the vehicle is improved. Simultaneously, the controller 40 may be configured to operate the light sources 31 of the optical module 30 disposed at the side opposite to the turning direction of the vehicle to emit light, thereby projecting an illumination image for transmitting a message based on turning of the vehicle.

Thereby, aerodynamic performance during turning of the vehicle may be ensured, and a message indicating that the vehicle is turning may be transmitted to the outside, thereby preventing an accident. The communication apparatus having the above-described structure through the grille 10 of the vehicle is capable of communicating with the outside through the grille 10 of the vehicle, and improves driving performance of the vehicle due to improvement in aerodynamic performance through the grille 10 of the vehicle.

As is apparent from the above description, a communication apparatus through a grille of a vehicle according to the present disclosure is capable of communicating with the outside through the grille of the vehicle, and improves driving performance of the vehicle due to improvement in aerodynamic performance through the grille of the vehicle.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A communication apparatus through a grille of a vehicle, comprising:
   the grille disposed on a front surface portion of the vehicle and including a plurality of ventilation apertures configured to pass air therethrough;
   a plurality of moving modules provided on the grille to be movable and having a plurality of shield parts configured to respectively match with the ventilation apertures;
   an optical module installed on the grille or the moving modules to emit light to an area in front of the vehicle; and
   a controller configured to adjust positions of the moving modules and turning-on and off of the optical module, to receive driving information of the vehicle, to operate the moving modules according to the driving information of the vehicle to close some of the ventilation apertures, and simultaneously to project an illumination image for transmitting a message through operation of the optical module;
wherein the shield parts are formed to have an area less than that of the ventilation apertures.

2. The communication apparatus according to claim 1, wherein the moving modules are installed at different positions, and individually moved to open or close all the ventilation apertures or to selectively open or close some of the ventilation apertures.

3. The communication apparatus according to claim 1, wherein each of the moving modules includes:
a drive unit installed on one of a vehicle body and the grille to transmit power; and
a moving unit provided to be movable in a lateral direction of the grille and having the shield parts configured to open or close the ventilation apertures.

4. The communication apparatus according to claim 3, wherein the drive unit is installed on the vehicle body to be spaced apart from the grille, the moving unit is disposed to be spaced backwards from the grille, and the shield parts extending forwards from the moving unit are provided to respectively match with the ventilation apertures.

5. The communication apparatus according to claim 1, wherein the moving modules are disposed at left and right sides of the grille, and installed to be movable laterally to individually open or close left ventilation apertures and right ventilation apertures of the grille.

6. The communication apparatus according to claim 5, wherein:
at initial positions of the respective moving modules divisionally disposed at the left and right sides of the grille, the shield parts are disposed behind the grille; and
when the moving modules are operated, the shield parts of the moving module disposed at the left side of the grille are moved leftwards from the initial position thereof, and the shield parts of the moving module disposed at the right side of the grille are moved rightwards from the initial position thereof.

7. The communication apparatus according to claim 1, wherein:
the grille is formed in a pattern in which the ventilation apertures have overlapping sections in a vertical direction; and
the moving modules are provided to intersect each other in the vertical direction of the grille, and, when the moving modules are operated, the shield parts configured to intersect each other in the vertical direction are moved in opposite directions.

8. The communication apparatus according to claim 1, wherein the optical module includes:
light sources installed on the grille to emit light rearwards towards the shield parts; and
reflectors fixed to the shield parts to be moved together with the shield parts, and to reflect light emitted from the light sources forwards to project the light to an outside of the grille to change a light projecting position together with movement of the shield parts.

9. The communication apparatus according to claim 1, wherein the controller is configured to determine whether the vehicle is driven autonomously, and project an illumination image for transmitting a message through the optical module in response to determining that the vehicle is driven autonomously.

10. The communication apparatus according to claim 1, wherein the controller is configured to operate each of the moving modules disposed at a side opposite to a turning direction of the vehicle during turning to close some of the ventilation apertures, and simultaneously operate the optical module to project an illumination image for transmitting a message based on turning of the vehicle.

* * * * *